United States Patent
Klein et al.

(10) Patent No.: US 10,186,262 B2
(45) Date of Patent: Jan. 22, 2019

(54) SYSTEM WITH MULTIPLE SIMULTANEOUS SPEECH RECOGNIZERS

(71) Applicant: Microsoft Technology Licensing, LLC, Redmond, WA (US)

(72) Inventors: Christian Klein, Duvall, WA (US); Dennis Mooney, II, Bellevue, WA (US); Thomas Soemo, Redmond, WA (US); Leo Soong, Kirkland, WA (US); Joseph Wheeler, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/956,145

(22) Filed: Jul. 31, 2013

(65) Prior Publication Data
US 2015/0039317 A1    Feb. 5, 2015

(51) Int. Cl.
*G10L 15/22*    (2006.01)
*G06F 3/16*    (2006.01)
(Continued)

(52) U.S. Cl.
CPC .............. *G10L 15/22* (2013.01); *G06F 3/167* (2013.01); *G10L 15/32* (2013.01); *G10L 15/30* (2013.01);
(Continued)

(58) Field of Classification Search
CPC .......... G10L 15/30; G10L 15/32; G10L 15/34
See application file for complete search history.

(56) References Cited

U.S. PATENT DOCUMENTS 5,664,061 A    9/1997    Andreshak et al.
5,754,978 A *  5/1998    Perez-Mendez et al. .... 704/255
(Continued)

FOREIGN PATENT DOCUMENTS

CN    1105464 A    7/1995
EP    986809 B1    9/2003

OTHER PUBLICATIONS

"International Search Report and Written Opinion Issued in PCT Patent Application No. PCT/US2014/048755", dated Oct. 27, 2014, 14 Pages.
(Continued)

*Primary Examiner* — Michael N Opsasnick
(74) *Attorney, Agent, or Firm* — Alleman Hall Creasman & Tuttle LLP

(57) ABSTRACT

A speech recognition system interprets both spoken system commands as well as application commands. Users may speak commands to an open microphone of a computing device that may be interpreted by at least two speech recognizers operating simultaneously. The first speech recognizer interprets operating system commands and the second speech recognizer interprets application commands. The system commands may include at least opening and closing an application and the application commands may include at least a game command or navigation within a menu. A reserve word may be used to identify whether the command is for the operation system or application. A user's cadence may also indicate whether the speech is a global command or application command. A speech recognizer may include a natural language software component located in a remote computing device, such as in the so-called cloud.

14 Claims, 10 Drawing Sheets

(51) Int. Cl.
*G10L 15/32* (2013.01)
*G10L 15/30* (2013.01)

(52) U.S. Cl.
CPC .. *G10L 2015/223* (2013.01); *G10L 2015/228* (2013.01)

(56) References Cited

U.S. PATENT DOCUMENTS

| | | | |
|---|---|---|---|
| 5,774,841 | A | 6/1998 | Salazar et al. |
| 6,122,613 | A | 9/2000 | Baker |
| 6,167,377 | A * | 12/2000 | Gillick et al. ............... 704/240 |
| 6,192,339 | B1 | 2/2001 | Cox |
| 6,233,559 | B1 | 5/2001 | Balakrishnan |
| 6,292,779 | B1 * | 9/2001 | Wilson et al. ............... 704/257 |
| 7,302,392 | B1 * | 11/2007 | Thenthiruperai ....... G10L 15/19 704/251 |
| 7,340,395 | B2 | 3/2008 | Gurram et al. |
| 8,165,886 | B1 | 4/2012 | Gagnon et al. |
| 8,311,836 | B2 | 11/2012 | Ativanichayaphong et al. |
| 8,340,975 | B1 | 12/2012 | Rosenberger |
| 8,886,521 | B2 * | 11/2014 | Patch ..................... G10L 15/265 704/9 |
| 9,229,681 | B2 | 1/2016 | Cho et al. |
| 2002/0016710 | A1 * | 2/2002 | Strong ........................ 704/255 |
| 2002/0193991 | A1 * | 12/2002 | Bennett et al. .............. 704/247 |
| 2004/0193426 | A1 * | 9/2004 | Maddux ................ G06Q 30/02 704/275 |
| 2004/0260562 | A1 * | 12/2004 | Kujirai ......................... 704/275 |
| 2005/0182625 | A1 * | 8/2005 | Azara ................... G06F 17/279 704/236 |
| 2007/0143115 | A1 * | 6/2007 | Falcon ................... G01C 21/26 704/270.1 |
| 2007/0156412 | A1 * | 7/2007 | Burns et al. ................. 704/275 |
| 2008/0059195 | A1 * | 3/2008 | Brown ......................... 704/270 |
| 2008/0300886 | A1 | 12/2008 | Patch |
| 2009/0326936 | A1 * | 12/2009 | Nagashima .................. 704/235 |
| 2010/0114577 | A1 | 5/2010 | Hayn et al. |
| 2011/0184730 | A1 | 7/2011 | LeBeau et al. |
| 2011/0301943 | A1 * | 12/2011 | Patch ..................... G10L 15/26 704/9 |
| 2012/0089392 | A1 * | 4/2012 | Larco ................... G10L 15/063 704/231 |
| 2013/0132089 | A1 | 5/2013 | Fanty et al. |
| 2014/0058732 | A1 * | 2/2014 | Labsky et al. ............... 704/254 |
| 2015/0039317 | A1 * | 2/2015 | Klein ..................... G10L 15/22 704/275 |

OTHER PUBLICATIONS

Phoophuangpairoj, Rong,"Using multiple HMM recognizers and the maximum accuracy method to improve voice-controlled robots", In International Symposium on Intelligent Signal Processing and Communications Systems, Dec. 7, 2011, 6 pages.

PCT Demand and Response to International Search Report and Written Opinion, dated Feb. 10, 2015, in PCT Patent Application No. PCT/US2014/048755.

"International Preliminary Report on Patentability Issued in PCT Application No. PCT/US2014/048755", dated Jun. 22, 2015, 8 Pages.

"Office Action Issued in Chinese Patent Application No. 201480043399. X", dated Sep. 26, 2018, 16 Pages.

* cited by examiner

SYSTEM WITH MULTIPLE SIMULTANEOUS SPEECH RECOGNIZERS

BACKGROUND

A system, including one or more computing devices, may understand a user's speech, which may include instructions to perform a particular computing task. A microphone included in the computing device may receive the user's speech and may be accessible by multiple users.

Some systems rely on a push-to-talk button to initiate the interpretation of the user's speech. Other systems may only recognize specific instructions regarding the system while other systems may only recognize instructions directed toward a specific application.

SUMMARY

The technology includes a speech-enabled system that interprets global commands, such as operating system commands, as well as commands for one or more applications that are spoken to an open microphone by one or more users. In the system, a user can easily speak to either the in focus application or the operating system at any time, regardless of the state of the operating system or which application is in the foreground.

Two speech recognizers may operate simultaneously in the system to support the interpretation of the operating system commands and application commands. The two speech recognizers may be stored in a first processor readable memory and executed by a processor simultaneously on a computing device. Alternatively, a first speech recognizer may be stored on a first processor readable memory and executed by a first processor on a first computing device and a second speech recognizer may be stored on a second processor readable memory and executed by a second processor on a second computing device that is remote, such as in the cloud or Internet. In an embodiment, the second speech recognizer includes a natural language software component to interpret natural language or speech from a user In embodiments, the operating system commands include at least: 1) launching or closing applications; 2) multitasking commands, such as switching between running applications; 3) social commands such as rating, sharing, inviting, etc; 4) search within the current application in focus or across the entire system; 5) controlling settings for the application; 6) controlling settings for the system; 7) commands that manipulate background tasks, such as pausing background music or controlling a voice call or playing of a video chat that is running concurrently with the primary application in focus.

In addition to the operating system commands, a user may speak commands directed toward an in focus application. The set of available local, or application commands, depends on the in focus application and is predetermined by the application. For example, application commands in an electronic interactive game application may include gameplay actions or navigation within the game's menu system. Similarly, commands in a media application may include transport controls (e.g. fast forward) or commands to browse the application's available content.

In embodiments, both the operating system and application may use unrestricted speech grammars and may modify and improve these grammars over time. In embodiments, speech commands are assumed to be directed to the in focus application and system reserved words or phrases may be used to identify a following operating system command(s). Alternatively, chaining or altering cadence by a user may also be used to identify an operating system command and/or application command. For example, a long pause after a spoken reserve word and one or more operating system commands indicates that a user has completed spoken operating system commands and the system may default back to presuming the next speech command is an application command (unless another reserve word is spoken). Chaining allows for the use of a single reserve word in an embodiment. In an alternate embodiment, a system may accept operating system commands as a default.

In an embodiment, an intelligent agent, such as a digital electronic intelligent agent, is included so that a user may have a multi-turn dialog or conversation. The operating system reserved word or phrase may be the name of the agent, or alternatively phrases such as "show me the shortcuts" or "system" may be used. The operating system speech recognizer is continuously listening for the reserved word(s) or phrase(s) in parallel to one or more application speech recognizers associated with one or more applications. Once a user has addressed the operating system, the one or more applications no longer receive speech input until the user's dialog with the intelligent agent (or operating system) is complete. As a result, interactions with an intelligent agent may involve multiple turn conversations.

Once an interaction is complete—either because a user explicitly dismisses an intelligent agent, because the conversation is naturally completed (i.e. executing the requested command requires no further information from the user), or because of an inactivity timeout—the input focus automatically returns to the in focus application A method embodiment of operating a computing device includes receiving, by a first speech recognizer, information that represents a global command from a microphone. Information that represents an application command from the microphone may be received by a second speech recognizer. The second speech recognizer operates simultaneously with the first speech recognizer. The computing device performs a computing operation in response to one of the information that represents the global command and the information that represents the application command.

An apparatus embodiment comprises at least one microphone to receive at least a first and second audio signal and at least one processor. The apparatus also includes at least one processor readable memory to store an operating system having processor readable instructions that includes a first speech recognizer and a second speech recognizer as well as an application having processor readable instructions. The at least one processor executes the processor readable instructions of the operating system to: 1) provide a first command to the operating system from the first speech recognizer in response to a reception of the first audio signal by first speech recognizer and 2) provide a second command to the application from the second speech recognizer in response to a reception of the second audio signal by second speech recognizer.

In another embodiment, one or more processor readable memories include instructions which when executed cause one or more processors to perform a method for processing speech. The method comprises receiving an audio signal and determining whether the audio signal represents an instruction to the operating system. The method also determines whether the audio signal represents an instruction to the application concurrently when determining whether the audio signal represents the instruction to operating system. An operating system command is output in response to the determining the audio signal represents the instruction to the operating system. An application command is output in response to the determining the audio signal represents the instruction to the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Speech recognition is included in a system, computing device, method and a processor readable memory that interprets both spoken global commands, such as operating system commands, as well as application commands. One or more users may utter commands to an open microphone of a computing device that may be interpreted by at least two speech recognizers operating simultaneously. The first speech recognizer interprets operating system commands and the second speech recognizer interprets application commands. The system commands may include at least opening and closing an application and the application commands may include at least a game command or navigation within a menu. A reserve word may be used to identify whether the command is for the operating system or application. A user's cadence may also indicate whether the speech is a global command or application command. A speech recognizer may include a natural language software component to interpret natural language or speech from a user. In an embodiment, the speech recognizer having a natural language software component is located in a remote computing device, such as in the so-called cloud.

Implementing such a system in a user friendly way is challenging for at least a number of reasons. The operating system commands and application commands may conflict entirely with one another (e.g. both the application and the operating system may include the speech command "go home," but with different meanings).

Also, the interpretation of operating system commands and application commands may conflict with one another, particularly when one or both speech recognizers support natural language understanding (e.g. a natural language phrase like "please continue" may have meaning in both contexts).

Even when the operating system commands and application commands themselves don't conflict, there may be a phonetic similarity between different commands in each context that causes the ambiguity in the recognized events (e.g. "accept this one" and "except this one").

Showing disambiguation at a user interface (UI) whenever a conflict occurs causes the system to feel slow and cumbersome, particularly when such conflicts occur frequently.

Showing disambiguation at a UI may not even be technically possible when the operating system and application use incompatible speech technologies (and hence no part of the system understands the semantics of both grammars).

Figure 1:
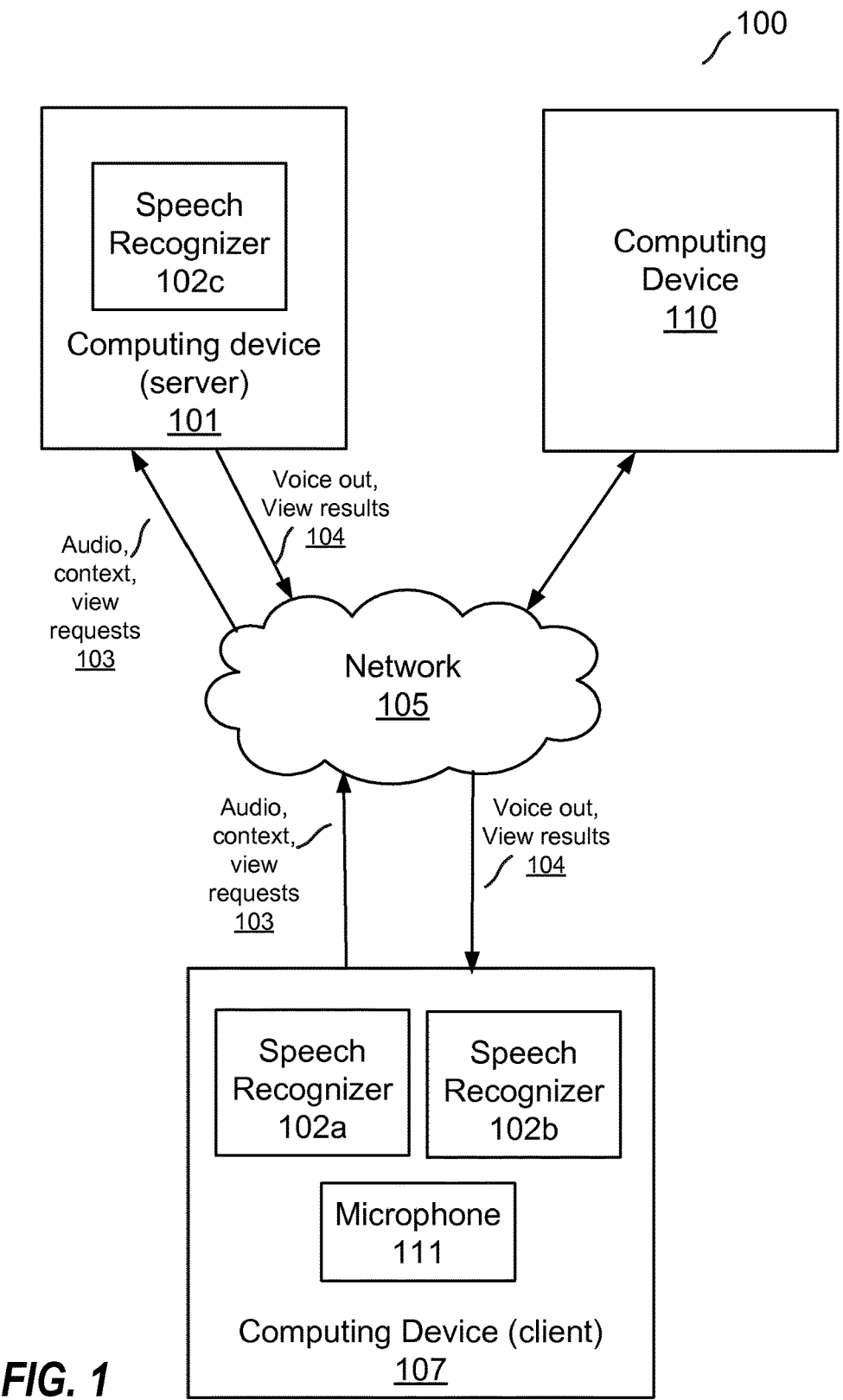
FIG. 1 is a high level block diagram of an exemplary system architecture.

FIG. 1 is a high-level block diagram of a system, or apparatus, 100 having multiple speech recognizer 102a-c operating simultaneously. In an embodiment, computing device 107 includes speech recognizers 102a-b operating simultaneously. Speech recognizer 102a is used for interpreting global commands, such as operating system commands, spoken by a user into microphone 111. Speech recognizer 102b is used for interpreting an in focus application commands spoken by a user into microphone 111 as described in detail herein. In alternate embodiments, multiple microphones may be used. In a further embodiment, computing device 101 includes speech recognizer 102c (that also may be operating simultaneously with speech recognizer 102a and/or 102b) that is accessed by computing device 107 by way of network 105.

In embodiments, global commands, such as operating system commands, include at least: 1) launching or closing applications; 2) multi-tasking commands, such as switching between running applications; 3) social commands such as rating, sharing, inviting, etc; 4) search within the current application in focus or across the entire system; 5) controlling settings for the application; 6) controlling setting for the system; 7) commands that manipulate background tasks, such as pausing background music or controlling a voice call or playing of a video chat that is running concurrently with the primary application in focus.

In addition to the operating system commands, a user may speak commands directed toward an in focus application. The set of available applications commands depends on the in focus application and is determined by the application. For example, commands in an electronic interactive game application may include gameplay actions or navigation within the game's menu system. Similarly, commands in a media application may include transport controls (e.g. fast forward) or commands to browse the application's available content.

In an embodiment, all words or phrases spoken by users are assumed to be directed toward the in focus application by default. A reserve word or phrase may be used to indicate that a following spoken word or phrase is directed to the operating system (e.g. "shortcuts," "system," "computer"). A user's cadence (or chaining) also may be used to identify words or phrases that are directed to the operating system and/or application as described in detail herein.

In an alternate embodiment, an operating system may be a default in which all words or phrases spoken by users are assumed to be directed toward the operating system by default. Similarly as using an in focus application as a default, reserved words (or a user's cadence) may be used to address an application instead of the default operating system.

In another embodiment, a global command (or operating system command) can switch focus to an application as a side effect of the global command, without relying on a separate reserved word or cadence distinction. For example, a global command "Computer go to web browser" may launch a web browser application and also automatically direct input focus to the web browser application for subsequent speech commands.

Figure 2:
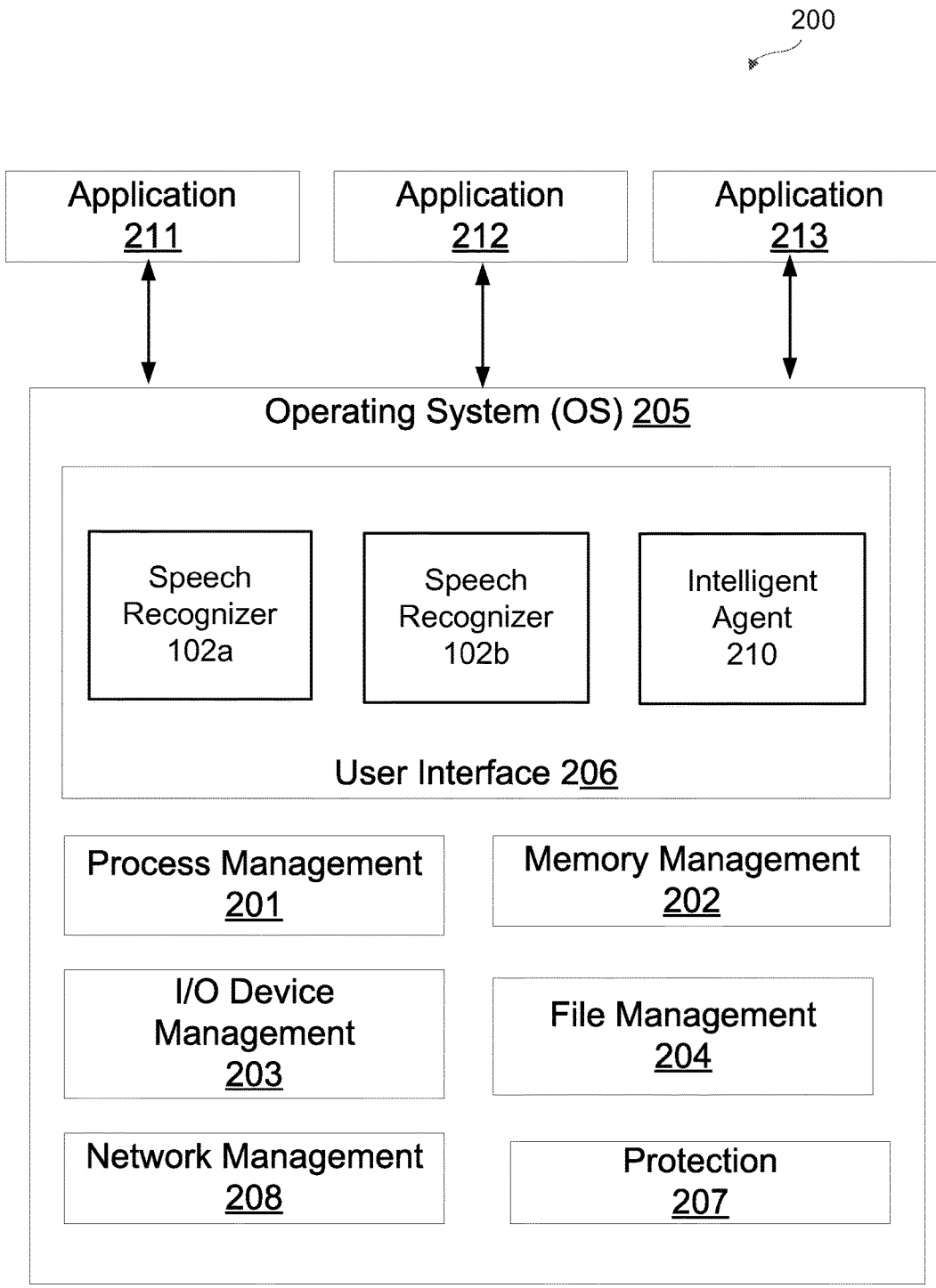
FIG. 2 is a high-level block diagram of a software architecture to operate at least two speech recognizers.

In an embodiment, computing device 107 includes an intelligent agent 210, as illustrated in FIG. 2, which may communicate with a user. In an embodiment, intelligent agent is a digital electronic intelligent agent. The reserve word or phrase may be the name of intelligent agent 210 in an embodiment. Speech recognizer 102a is continuously listening for the reserve word(s) or phrase(s) in parallel to speech recognizers 102b and/or 102c which are responsible for application commands. Once a user has addressed an intelligent agent 210 (or operating system), the application no longer receives speech input until a user's dialog with the operating system is complete. As a result, interactions with intelligent agent 210 may involve multiple turn conversations. Once the interaction is complete—either because the user explicitly dismisses intelligent agent 210, because the conversation is naturally completed (i.e. executing the requested command requires no further information from the user), or because of an inactivity timeout—the input focus automatically returns to the in focus application.

In an embodiment, system 100 is in an open microphone environment (e.g. a living room speech recognition system that avoid a push-to-talk interaction) with a reserve word (e.g. "computer") used to enable speech recognition of operating system commands. To avoid requiring a user to speak a second reserve word to disambiguate between application commands and operating system commands, system 100 can disambiguate based on the cadence of the user's speech. Specifically, system 100 interprets words chained behind a reserve word as operating system commands, while allowing the same reserve word to be used for non-chained application commands. For example:

"Computer go home" is a fully chained global command and is recognized by the speech recognizer 102a.

"Computer . . . " " . . . show map" is recognized by first "computer" being recognized as a reserve word using speech recognizer 102a and then speech recognizer 102b recognizes the application command " . . . show map."

"Computer . . . " " . . . shortcuts . . . " " . . . go home" is a non-chained operating system command, recognized by speech recognizer 102a, that relies on an explicit second reserve word "shortcuts" to switch from a default of on an application command to on an operating system command.

In system 100, a user can easily speak to either an application or an operating system at any time, regardless of the state of the operating system or which application is in the foreground. Both the application and the operating system may use unrestricted speech grammars/commands and may modify and improve these grammars over time. In an embodiment, an application does not use a reserve word(s) or phrase(s) ("Computer" and "shortcuts" in the examples above) used by the operating system.

In an embodiment, computing device 101 is at a remote physical location from computing device 107 and may be included in the so-called cloud. In an alternate embodiment, computing device 107 does not communicate by way of network 105, and in particular does not communicate with speech recognizer 102c in computing device 101. Computing devices 101 and 107 may communicate by way of network 105, such as the Internet, as described herein. In further embodiments, computing device 110 communicates with computing devices 101 and 107 by way of network 105.

Figure 8:
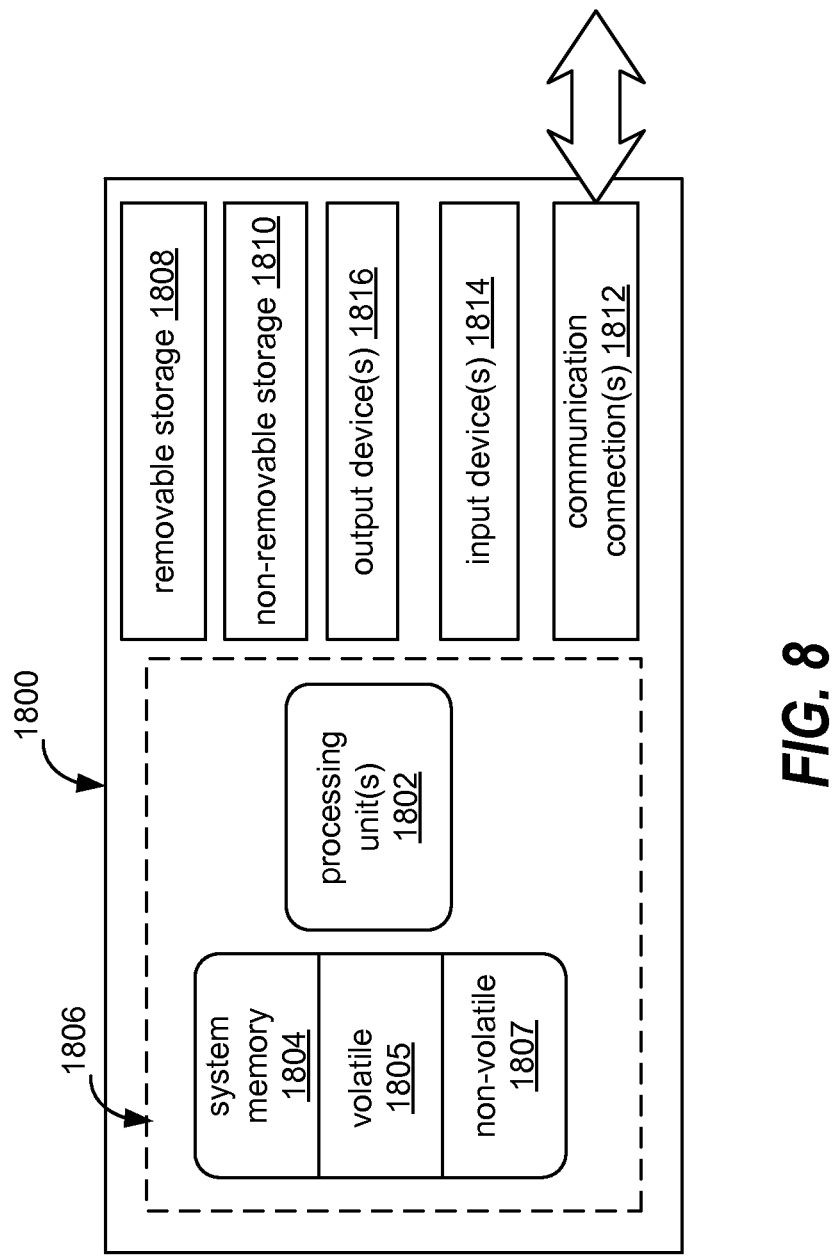
FIG. 8 is an exemplary computing device.

In an embodiment, computing device 107 is included in a video game console and/or media console described herein and illustrated in FIGS. 8 and 9. In an alternate embodiment, computing device 101 and/or 107 is a computing device as illustrated in FIG. 8 and described herein. In alternate embodiments, computing device 107 may be included in at least a cell phone, mobile device, embedded system, laptop computer, desktop computer, server and/or datacenter. In an embodiment, computing device 101 is a server and/or datacenter.

In an embodiment, computing device 101 provides voice out and view results 103 to computing device 107 in response to audio, context and view requests 104 from computing device 107. In an embodiment, computing device 107 that may be a client of computing device 101.

Similarly, computing device 110 may provide similar information, to computing device 107. In an embodiment, computing devices 110 and 107 are peers and transfer audio, context and view requests 104 as such in an embodiment. In a peer-to-peer (P2P) embodiment of computing devices 101, 107 and 110, each computing device may act as a client or a server of the other.

In alternate embodiments, system 100 includes many more or less computing devices and/or servers to provide and receive information. In embodiments, computing device 101, computing device 110 and/or computing device 107 corresponds to computing device 1800 having particular hardware components illustrated in FIG. 8 and as described herein.

In embodiments, computing devices 101, 107 and 110 include one or more processor readable memories to store software components having processor readable instructions as described herein. In embodiments, computing device 101, 107 and 110 include one or more processors to execute the processor readable instructions.

In an embodiment, network 105 may be the Internet, a Wide Area Network (WAN) or a Local Area Network (LAN), singly or in combination. In embodiments, computing device 107 is included in another network. Information may be transferred by wire and/or wirelessly in network 105.

FIG. 2 is a high-level block diagram of an exemplary software architecture 200 that operates at least two speech recognizers 102a-b simultaneously. Operating System (OS) 205 includes speech recognizer 102a that is used to process system commands and speech recognizer 102b that is used to process an in focus application command. In an embodiment, OS 205 includes intelligent agent 210 to communicate with a user. Intelligent agent 210 may communicate with a user using natural language in which multi-turn conversation or dialog is used. In embodiments, speech recognizer 102b may be used with one or more applications 211-213. In an embodiment, more speech recognizers may be used. In an embodiment, applications 211-213 may include one or more electronic interactive games.

OS 205 and application 211-213 may be developed using different technologies, including speech recognition technologies that run on a remote computing device, such as in the so-called the cloud, or on a local computing device, and may include a combination of natural language understanding software components and/or more simple command and control grammars software components. Applications 211-213 may be implemented using various speech middleware technologies or may leverage speech recognition technology provided by OS 205 in embodiments.

In an embodiment, OS 205 and applications 211-213 includes one or more of software components. In an embodiment, a software component may include a software program, software object, software function, software subroutine, software method, software instance, script and/or a code fragment, singly or in combination. For example, OS 205 includes one or more of user interface (UI) 206, process management 201, memory management 202, input/output (I/O) device management 203, file management 204, network management 208 and protection 207. One or more exemplary functions that may be performed by the various OS software components are described below. In alternate embodiment, more or less software components and/or functions of the software components described below may be used.

In embodiments, at least portions of OS 205 are stored in processor readable memories. In an embodiment, at least portions of OS 205 are stored in memories of computing device 107 illustrated in FIG. 1.

Processes management 201 is responsible for creating and deleting user and system processes. Process management 201 may also be responsible for suspension and resumption of processes. Process management 201 is also responsible for synchronization and communication of processes. Process management 201 is also responsible for deadlock handling.

Memory management 202 is responsible for keeping track of which part of memory in the different types of memory is currently being used by a particular software component or application. Memory management 202 also decides which processes are loaded into memory when memory space becomes available. Memory management also allocates and deallocates memory space as needed.

I/O device management 203 is responsible for managing I/O devices. In an embodiment, the peculiarities of specific hardware are hidden from users. In an embodiment, device drivers know the peculiarities of the specific device. For example, I/O device management 203 may be responsible for disk management functions such as free space management, memory allocation, fragmentation, removal and head scheduling.

File management 204 is responsible for creating and deleting files and directories. File management 204 may support a hierarchical file system. File management 204 may also back up files onto secondary memory.

Network management 208 is responsible for communication with networks including providing connection/routing methods. Network management 208 may also be responsible for data/process migration to other computing devices.

Protection 207 is responsible for controlling access of software components, processes, and/or users to resources of the computing device. For example, protection 207 is responsible for controlling access to resources such as central processing unit (CPU), cycles, memory, files, and/or I/O devices. Protection 207 is also responsible for user authentication and communication.

User interface 206 provides a speech, natural language, character and/or graphics user interface to a user and is responsible for receiving input and providing output to a user.

In an embodiment, a user may enter input to console 1002, as described in detail herein, by way of gesture, touch or voice. In an embodiment, optical I/O interface 1135 receives and translates gestures of a user. In an embodiment, console 1002 includes a natural user interface (NUI) as user interface 206 to receive and translate voice and/or gesture inputs from a user. In an embodiment, front panel subassembly 1142 includes a touch surface and a microphone for receiving and translating a touch or voice, such as a voice command, of a user as described in detail herein. In an embodiment, user interface 206 includes speech recognizer 102*a-b* and/or intelligent agent 210, as described herein to translate, spoken operating system commands and application commands provided to a microphone of console 1002 from one or more users.

Figure 3A:
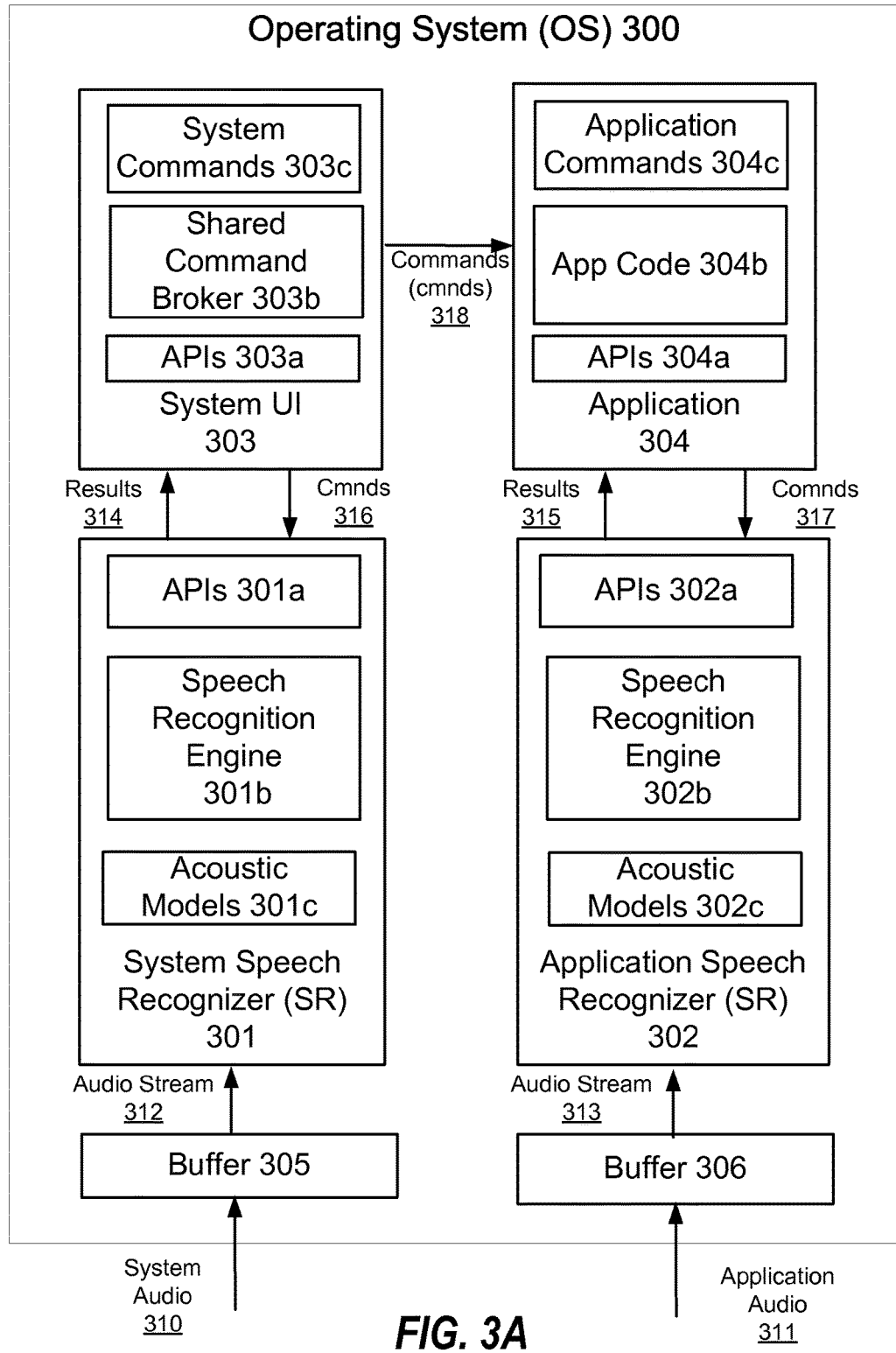
FIG. 3A is high-level block diagram of an exemplary operating system having two speech recognizers.
Figure 3B:
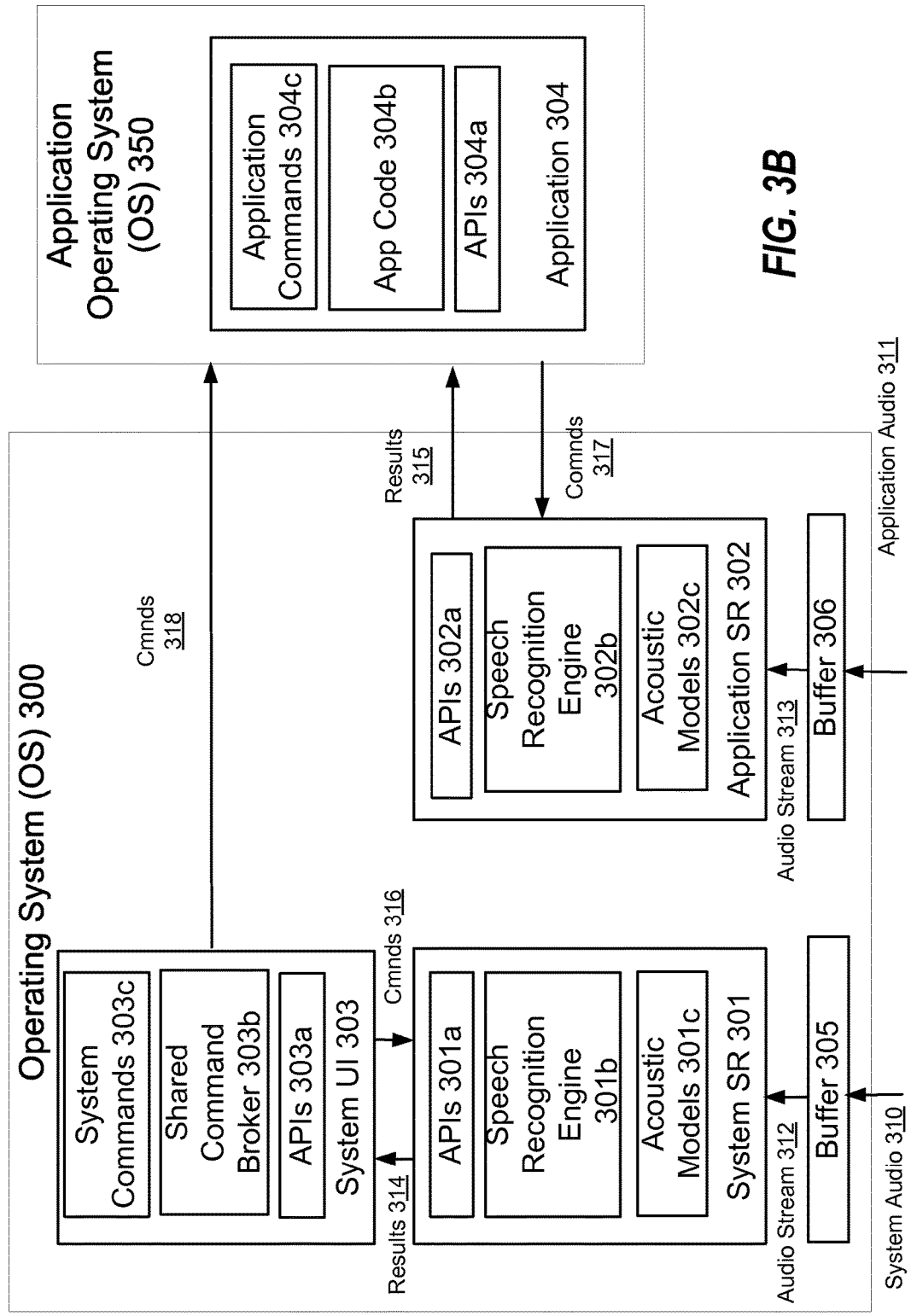
FIG. 3B is a high-level block diagram of an exemplary operating system having two speech recognizers and an electronic interactive game operating system.
Figure 3C:
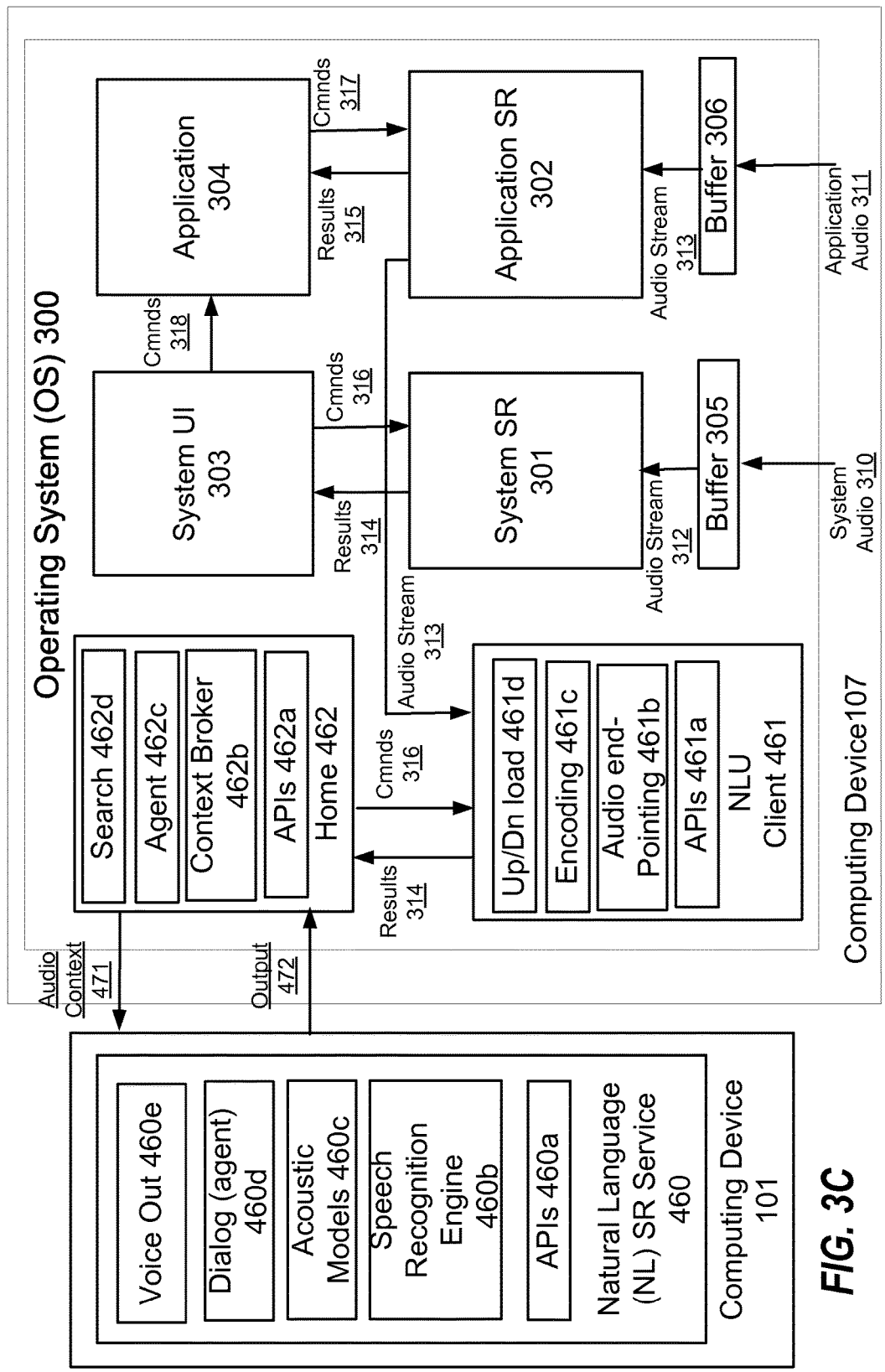
FIG. 3C is a high level block diagram of a system having two speech recognizers with at least one of the speech recognizers located on a remote computing device.

FIG. 3A is high-level block diagram of an exemplary OS 300 having two speech recognizers, such as system SR 301 and application SR 302. In embodiments, system audio 310 and application audio 311 are received by buffers 305 and 306 as illustrated in FIGS. 3A-C. In an embodiment, system audio 310 and application audio 311 are signals that represents a user's speech received from microphone 111 illustrated by FIG. 1. In an alternate embodiment, the system and application audio stream 311 and 312 are signals representing a user's speech received from multiple microphones 1011 illustrated in FIG. 6. In an alternate embodiment, a single audio signal is received by buffers 305 and 306 from a single microphone.

Buffers 305 and 306 output audio stream 312 and 313 to system SR 301 and application SR 302. Audio streams 312 and 313 are digital multi-bit wave representations of system audio 310 (or a user's speech) and application audio 311 (or a user's speech).

System SR 301 receives audio stream 312 and interprets or translates audio stream 312 to text and then searches for a text that most closely matches the audio stream. System SR 301 then outputs a recommended operating system command text and confidence level or confidence percentage as results 314 to system UI 303.

In an embodiment, system SR 301 including application programming interfaces (APIs) 301*a*, speech recognition engine 301*b* and acoustic model 301*c*.

APIs 301*a* is an application programming interface that specifies how software components interact with each other. In an embodiment, APIs 301*a*, as well as other APIs described herein, is a library that usually includes specifications for routines, data structures, object classes and variables. In an embodiment, APIs 301*a* include speech APIs that allow the use of speech recognition and speech synthesis within a system SR 301.

Speech recognition engine 301*b* with acoustic model 301*c* analyzes the sounds of a user's voice and converts them to phonemes, the basic elements of speech. The English language contains approximately 50 phonemes.

In an embodiment, acoustic model 301*c* removes noise and unneeded information such as changes in volume. Then, using mathematical calculations, an acoustic model 301*c* reduces audio data to a spectrum of frequencies (the pitches of the sounds), analyzes the audio data, and converts the words into digital representations of phonemes.

In an embodiment, speech recognition engine 301*b* includes a language model. A language model analyzes the content of a user's speech. It compares the combinations of phonemes to the words in its digital dictionary, a huge database of the most common words in the English language. In an embodiment, a dictionary containing about 150,000 words. The language model quickly decides which words a user spoke.

In an embodiment, trigrams in a language model are used to analyze context and distinguish between words that sound the same, such as "there," "their," and "they're." In many cases speech recognition engine 301*b* can recognize a word by looking at the two words that come before it. For example, when a user says, "let's go there," for example, the "let's go" helps the software decide to use "there" instead of "their."

Application SR 302 has similar components to system SR 301. Application SR 302 receives audio stream 313 and interprets or translates audio stream 313 to text and then searches for a text that most closely matches the audio stream. Application SR 302 then outputs a recommended application command text and confidence level or confidence percentage as results 315 to application 304.

In an embodiment, application SR 302 including application programming interfaces (APIs) 302a, speech recognition engine 302b and acoustic model 302c.

APIs 302a is an application programming interface that specifies how software components interact with each other. In an embodiment, API 302a is a library that usually includes specifications for routines, data structures, object classes and variables. In an embodiment, APIs 302a include speech APIs that allow the use of speech recognition and speech synthesis within application SR 302.

Speech recognition engine 302b with acoustic model 302c analyzes the sounds of a user's voice and converts them to phonemes as described herein.

In an embodiment, acoustic model 302c removes noise and unneeded information such as changes in volume. Then, using mathematical calculations, an acoustic model 302c reduces audio data to a spectrum of frequencies (the pitches of the sounds), analyzes the audio data, and converts the words into digital representations of phonemes.

In an embodiment, speech recognition engine 302b includes a language model as described herein.

System UI 303 determines whether a system command was spoken and outputs the associated system command. In an embodiment, System UI 303 includes APIs 303a, shared command broker 303b and system commands 303c.

In an embodiment, APIs 303a are application programming interfaces as described herein.

Shared command broker 303b compares the recommended operating system command in results 314 with a list or plurality of reserve words and predetermined operating system commands in system commands 303c. When a reserve word in the recommended operating system command matches a reserve word in system commands 303c, shared command broker 303b attempts to match one or more recommended operating system commands following the reserve word with operating system commands in system commands 303c. When a match occurs, system UI 303 provides the associated operating system command as commands 316 and 318 in embodiments.

Shared command broker 303b is also responsible for determining when application SR 302 is disengaged and reengaged in an embodiment. For example, when an operating system command is provided and processed by a computing device, application SR 302 is disengaged until the operating system command has been processed. Shared command broker 303b is also responsible to determine cadence of a user's speech, or the period of time (or silence) between words or phrases such that a series of operating system commands may be chained as described herein.

Application 304 includes APIs 304a, app code 304b and application commands 304c. APIs 304a are application programming interfaces as described herein. App code 304b is processor readable instructions to perform an application, such as an interactive electronic game. Application commands 304c includes a list or plurality of predetermined application commands.

In an embodiment, app code 304b, compares the application text output as results 315 to application commands in application commands 304c. When a valid application command is identified, application 304 and in particular app code 304b executes the application command. In an embodiment, application 304 may also output the application command to other software components, such as commands (cmnds) 317 output to application SR 302 as illustrated in FIGS. 3A-C.

FIG. 3B is a high-level block diagram of an exemplary operating system having two speech recognizers and an electronic interactive game operating system. In an embodiment illustrated by FIG. 3B, OS 300 operates similarly as described herein and illustrated in FIG. 3A. In an embodiment illustrated by FIG. 3B, application 304 is by executed within an application OS 350, such as an electronic interactive game operating system.

FIG. 3C is a high level block diagram of a system having two speech recognizers with at least one of the speech recognizers located on a remote computing device 101, in the so-called cloud. FIG. 3C is similar to FIG. 3A having buffers 305-306, system SR 301, application SR 302, system UI 303 and application 304. In addition, OS 300 includes natural language unit (NLU) client 461 and home 462 that communicate with NL SR service 460. In an embodiment, NL SR service 460 includes processor readable instructions stored on and executing on computing device 107. In an embodiment, NL SR service 460 includes a speech recognizer for interpreting natural language speech from a user that is executing at least at a portion of a time that at least system SR 301 is operating to interpret operating system commands from a user.

In an embodiment, application SR 302 passes audio stream 313 that represents a user's speech to NLU client 461. In an embodiment, the user's speech may be in the form of natural language, such as query to "Find funny movies." NL SR service 460 will return a list of funny movies after a search and provide the list of funny movies in a text version and/or spoken version from an audio voice out in an embodiment. NL SR service 460 may include a digital electronic intelligent agent, such as dialog (agent) 460d that will allow a user to have a multi-turn conversation with the intelligent agent. For example, the intelligent agent may ask, in response to the query: "During what time period are you interested? 90s?" In an alternate embodiment, a digital electronic intelligent agent may be agent 462c in home 462.

NLU client 461 acts as a client to NL SR service 460 in an embodiment. NLU client 461 includes APIs 461a, audio end-pointing 461b, encoding 461c and upload/download (Up/Dn) 461d.

APIs 461a are application programmable interfaces as described herein.

Audio end-pointing 461b is responsible for identifying an end-point of audio stream 313, such as an end to a question.

Encoding 461c encodes the portion of audio stream 31 (such as a question) output from audio end-pointing 461b and upload/download prepare the portion of the audio stream 313 to be sent to home 462 and eventually NL SR service 460.

Home 462 includes APIs 462a, context broker 462b, agent 462c and search 462d. Home 462 is responsible for communicating with NL SR service 460.

APIs 462a are application programming interfaces as described herein.

Context broker 462b is responsible for providing context information of the portion of audio stream 313 to NL SR service 460 as illustrated by audio/context 471. In an embodiment, audio/context 471 includes a portion of audio stream 313, context of the portion of audio stream 313 and view requests. In an embodiment, view requests indicate whether a user would like the output 472 from NL SR service 460 displayed as well as spoken output.

Agent 462c is a digital electronic intelligent agent that enables users to have multi-turn natural language conversation in an embodiment.

Search 462d is responsible for completing a search at a remote computing device, such as remote computing device 110. For example, when a user asks for "Find funny movies" and the output 472 of NL SR service 460 includes a spoken version of the results (spoken list of funny movies) as well as displayed text (text list of funny movies), search 462d may search a database for the resulting movies at a remote computing device so that the titles or movies may be provided to a user having the query.

NL SR service 460 is a natural language software component having processor readable instructions, stored in a processor readable memory, which are executed by a processor on computing device 101 so that a natural language interpretation of an audio stream service is provided to a client, such as home 462 and NL client 461. In response to receiving audio/context 471 from a client, NL SR service 460 provides output 472 which includes view results and a voice output.

NL SR service 460 includes APIs 460a, speech recognition engine 460b, acoustic model 460c, dialog (agent) 460d, and voice out 460e.

APIs 460 are application programmable interfaces as described herein.

Speech recognition engine 460b is a natural language speech recognition engine in an embodiment.

Acoustic model 460c is an acoustic model used with speech recognition engine 460b.

Dialog (agent) 460d is responsible for providing a dialog with a user. In an embodiment, dialog (agent) 460d is a digital electronic intelligent agent that provides a multi-turn conversation with a user.

Voice out 460e provides output 472 that includes view results and a voice out in response to receiving audio, context and view requests audio/context 471. For example, voice out 460e provides a list of funny movies, both in text and spoken version as output 472, in response to a user speaking the query: "Find funny movies."

Figure 4:
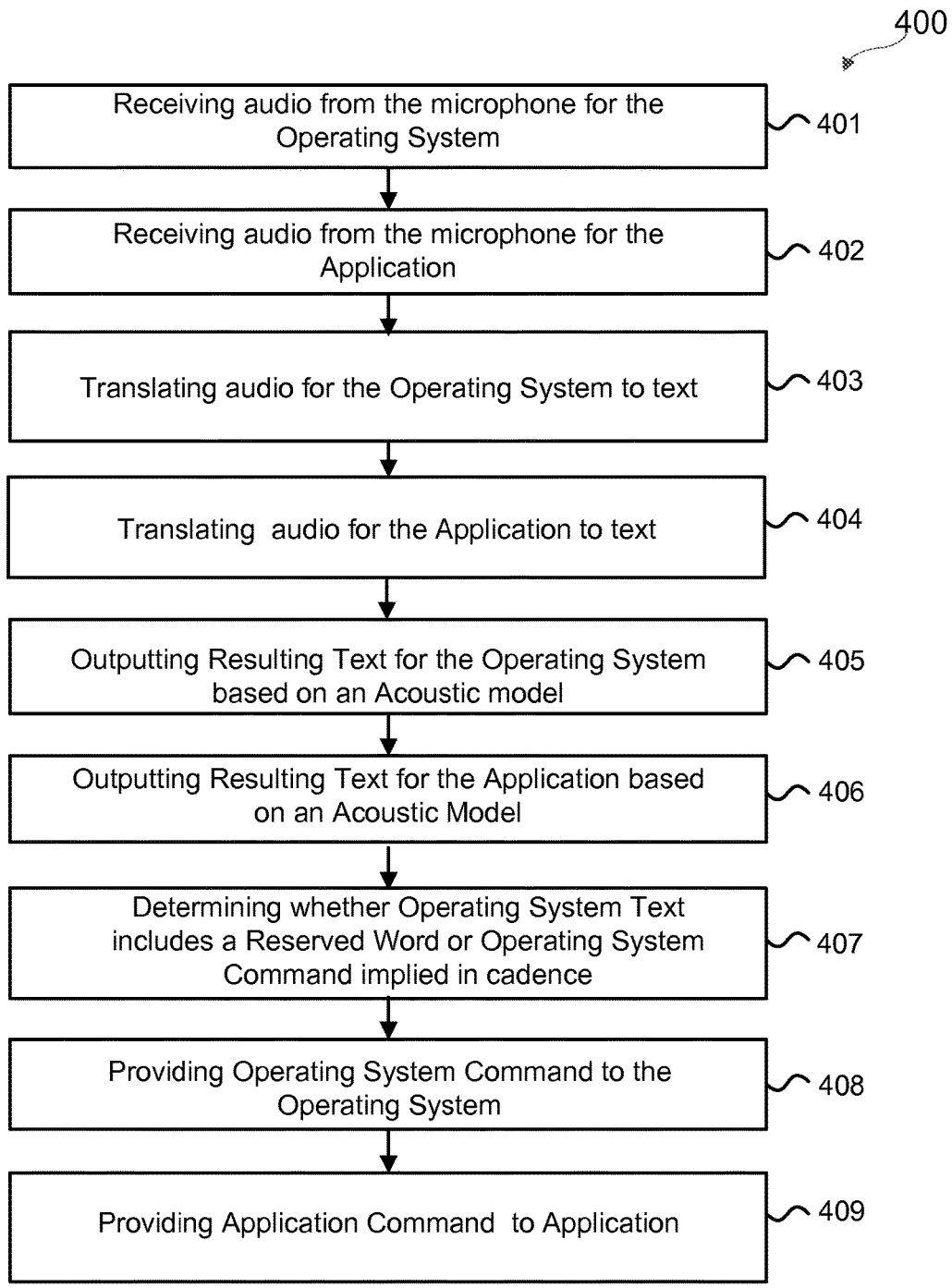
FIGS. 4-5A-C are flow charts of exemplary methods to recognize an application command and an operating system command.
Figure 5A:
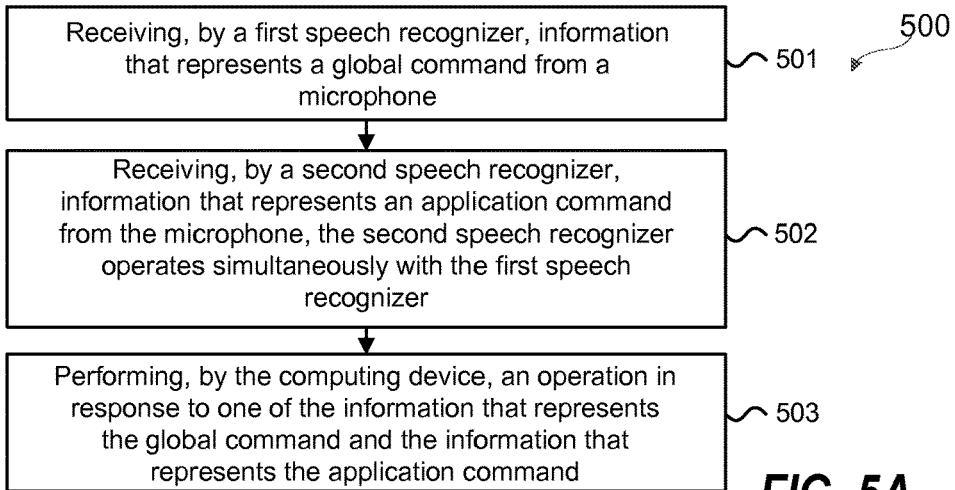
Figure 5B:
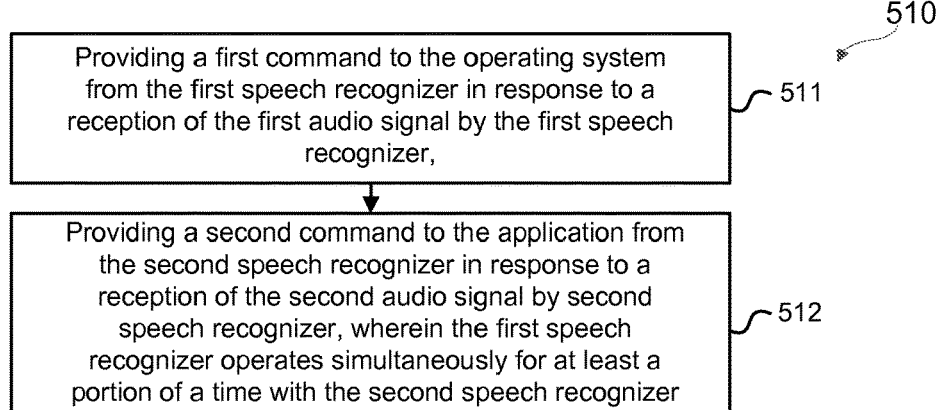
Figure 5C:
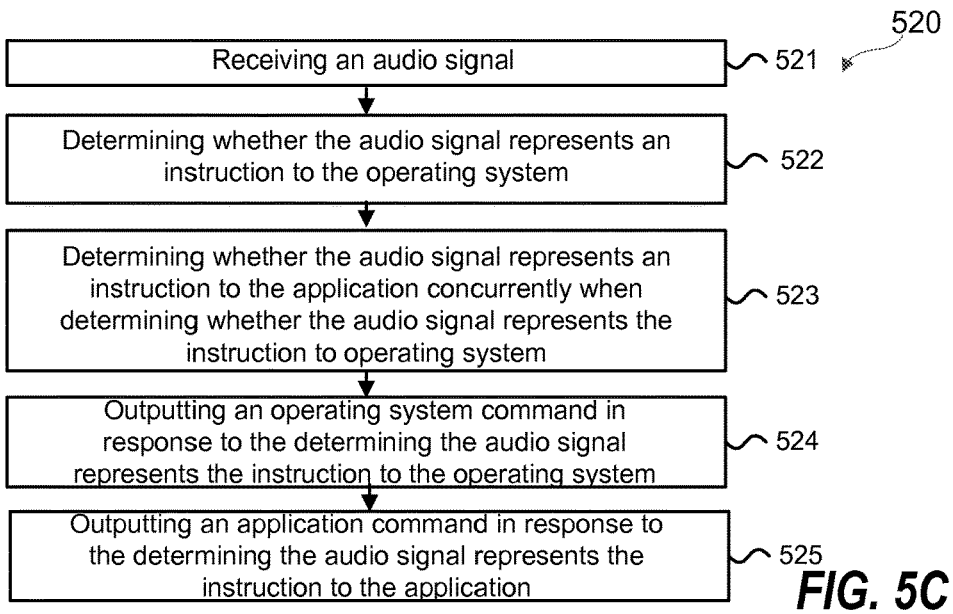

FIGS. 4-5C are flow charts illustrating exemplary methods of operating at least two speech recognizers to interpret user speech including operating system commands and application commands. In embodiments, steps illustrated in FIGS. 4-5C represent the operation of hardware (e.g., processor, memory, circuits), software (e.g., OS, applications, drivers, machine/processor executable instructions), or a user, singly or in combination. As one of ordinary skill in the art would understand, embodiments may include less or more steps shown.

FIG. 5A is a flow chart of an exemplary method 500 to recognize an application command and a global command spoken by a user. In an embodiment, method 500 is performed by computing device 107, in particular speech recognizer 102a-b, illustrated in FIG. 1.

Step 501 illustrates receiving, by a first speech recognizer, such as speech recognizer 102a, information that represents a global command from a microphone, such as microphone 111 shown in FIG. 1. In an embodiment, the global command may be an operating system command. In an embodiment, the information includes an audio signal representing the global command of a user.

Step 502 illustrates receiving, by a second speech recognizer, such a speech recognizer 102b, information that represents an application command from the microphone, such as microphone 111. The second speech recognizer operates simultaneously with the first speech recognizer. In an embodiment, the second speech recognizer may be located at a remote computing device, such as speech recognizer 102c in computing device 101 shown in FIG. 1. The remote computing device may be considered to be in the so-called cloud. For example, speech recognizer 102c may include a natural language software component to interpret natural language from users and communicate by a natural language output or voice.

Step 503 illustrates performing, by the computing device-such as computing device 107, an operation in response to one of the information that represents the global command and the information that represents the application command. Application commands and global commands, such as operating system commands, include at least the commands described herein. In embodiments, an application may be running or being executed in the system operating system or application operating system as illustrated in FIGS. 3A-B.

In other embodiments, steps 501-503 are performed by at least exemplary software components and hardware shown in FIGS. 2-3C and 6-8. For example, method 500 may be performed by console 1002 illustrated in FIGS. 6-7 or computing device 1800 illustrated in FIG. 8.

FIG. 5B is a flow chart of an exemplary method 510 to recognize a first command to an operating system and a second command to an application, such as an electronic interactive game. In an embodiment, method 510 is performed by computing device 107, in particular speech recognizer 102a-b, illustrated in FIG. 1.

Step 511 illustrates providing a first command to the operating system from the first speech recognizer in response to a reception of the first audio signal by the first speech recognizer. In an embodiment, the first speech recognizer is system SR 301 illustrated in FIGS. 3A-C. In an embodiment, the audio signal is audio stream 312 shown in FIGS. 3A-C. In an embodiment, the first command includes operating system commands as at least described herein.

Step 512 illustrates providing a second command to the application from the second speech recognizer in response to a reception of the second audio signal by second speech recognizer. The first speech recognizer operates simultaneously for at least a portion of a time with the second speech recognizer. In an embodiment, the second speech recognizer is application SR 302 illustrated in FIGS. 3A-C. In an alternate embodiment, the second speech recognizer may be located at a remote computing device, such as speech recognizer 102c or NL SR service 460 in computing device 101 shown in FIG. 1. The remote computing device may be considered to be in the so-called cloud. In an embodiment, the audio signal is audio stream 313 shown in FIGS. 3A-C. In an embodiment, the second command includes application commands as at least described herein.

In other embodiments, steps 511-512 are performed by at least exemplary software components and hardware shown in FIGS. 2-3C and 6-8. For example, method 510 may be performed by console 1002 illustrated in FIGS. 6-7 or computing device 1800 illustrated in FIG. 8.

FIG. 5C is a flow chart of an exemplary method 520 to output an operating system command and/or application command by at least instructions stored on processor readable memory executed by at least one processor in response to speech by a user. In an embodiment, method 520 is performed by computing device 107 having a processor executing processor readable instructions stored on a memory, in particular speech recognizer 102*a-b*, illustrated in FIG. 1.

Step 521 illustrates receiving an audio signal. In embodiments, system audio 310 and application audio 311 are received as illustrated in FIGS. 3A-C. In an embodiment, the system and application audio signals represent a user's speech received from microphone 111 illustrated by FIG. 1. In an alternate embodiment, a single audio signal is received.

Step 522 illustrates determining whether the audio signal represents an instruction to the operating system. In an embodiment, speech recognizer 102*a* and system UI 303 perform this function.

Step 523 illustrates determining whether the audio signal represents an instruction to the application. In an embodiment, this determination is performed concurrently when determining whether the audio signal represents the instruction to operating system. In an embodiment, speech recognizer 102*b* and application 304 perform this function. In alternate embodiments, NL SR service 460 and application 304 perform this function. In an embodiment, the NL SR service 460 may be located at a remote computing device 101 shown in FIGS. 1 and 3C. The remote computing device may be considered to be in the so-called cloud.

Step 524 illustrates outputting an operating system command in response to the determining the audio signal represents the instruction to the operating system. In an embodiment, system UI 303 performs this function. In an embodiment, the operating system command is at least described in detail herein.

Step 525 illustrates outputting an application command in response to the determining the audio signal represents the instruction to the application. In an embodiment, application 304 performs this function. In an embodiment, the application command is at least described in detail herein.

In other embodiments, steps 521-525 are performed by at least exemplary software components and hardware shown in FIGS. 2-3C and 6-8. For example, method 520 may be performed by console 1002 illustrated in FIGS. 6-7 or computing device 1800 illustrated in FIG. 8.

FIG. 4 is a flow chart of an exemplary method 400 to provide an operating system command and/or application command. In an embodiment, method 400 is performed by computing device 107 executing OS 300 having processor readable instructions, in particular speech recognizer 102*a-b*, as illustrated in FIG. 3A. In an alternate embodiment, application OS 350 is also executed by computing device 107 as illustrated in FIG. 3B. In still a further embodiment, NL SR service 460 having processor readable instructions is executed by computing device 101.

Steps 401 and 402 illustrate receiving an audio signal for an operating system and audio signal for an application. In embodiments, system audio 310 and application audio 311 are received as illustrated in FIGS. 3A-C. In an embodiment, the system and application audio signals represent a user's speech received from microphone 111 illustrated by FIG. 1. In an alternate embodiment, a single audio signal is received.

Step 403 illustrates translating audio for the operating system to text. In an embodiment, system SR 301, as illustrated in FIGS. 3A-C, performs this function.

Step 404 illustrates translating audio for the application to text. In an embodiment, application SR 302, as illustrated in FIGS. 3A-B, performs this function. In an embodiment, NL SR service 460 performs this function as application audio signal 311 is passed to NL SR service 460 executing on computing device 101 by way of network 105.

Step 405 illustrates outputting resulting text for the operating system based on an acoustic model. In an embodiment, system SR 301 including APIs 301*a*, speech recognition engine 301*b* and acoustic model 301*c* perform this function as illustrated in FIGS. 3A-C. In particular, a recommended operating system command text and confidence level or confidence percentage is output as results 314 to system UI 303.

Step 406 illustrates outputting resulting text for the application based on an acoustic model. In an embodiment, system SR 302 including APIs 302*a*, speech recognition engine 302*b* and acoustic model 302*c* perform this function as illustrated in FIGS. 3A-B. In an embodiment in which natural language is translated and results are communicated back to a user, NL SR service 460 executing on computing device 101 performs this function. In an embodiment, a recommended application command text and confidence level or confidence percentage is output as results 314 to application 304 executing in OS 300. In an alternate embodiment, a recommended application command text and confidence level or confidence percentage is output as results 314 to application 304 executing in application OS 350.

Step 407 illustrates determining whether operating system text output as result 314 includes a reserved word or additional operating system commands are implied in a user's cadence. In an embodiment, system UI 303 compares the operating system text output as results 314 to reserve words, such as "computer," in system commands 303*c* which includes a list or plurality of reserve words. When a reserve word is identified, a determination is made that the operating system text includes an operating system command following the reserve word. By default, all interpreted commands from an audio stream are assumed to be application commands unless a reserve word is detected. When a reserve word is detected, system UI 303 outputs commands to disengage application SR 302 from analyzing and outputting results.

System UI 303, and in particular shared command broker 303*b*, also determines whether words following a reserve word are system commands or are series of system commands that are chained—a series of words with a relatively short period of time between each word. Shared command broker 303*b* also determines the amount or period of time between words or phrases in order to determine whether multiple system commands are chained or an application command may follow an operating system command after a predetermined amount of time or silence has occurred from the most recently spoken operating system command. Shared command broker 303*b* also identifies whether a return to the application command default setting occurs when the operating system command is completed or a conversation with a digital conversational intelligent agent is completed in embodiments.

Step 408 illustrates providing an operating system command to the operating system. In an embodiment, system UI 303 determines whether one or more operating system commands has been spoken and outputs the associated operating system commands as illustrated by commands 316 and 318 shown in FIGS. 3A-C.

Step 409 illustrates providing an application command to an application. In an embodiment, application 304, in particular app code 304*b*, compares the application text output as results 315 to application commands in application commands 304*c* which includes a list or plurality of predetermined application commands. When a valid application command is identified, application 304 and in particular app code 304b executes the application command. In an embodiment, application 304 may also output the application command to other software components, such as commands (cmnds) 317 output to application SR 302 as illustrated in FIGS. 3A-3C.

In an alternate embodiment, NL SR service 460 executing on computing device 101 and home 462 as well as NLU client 461 likewise may provide an application command to an application.

In other embodiments, steps 401-409 are performed by at least exemplary software components and hardware shown in FIGS. 2-3C and 6-8. For example, method 400 may be performed by console 1002 illustrated in FIGS. 6-7 or computing device 1800 illustrated in FIG. 8.

Figure 6:
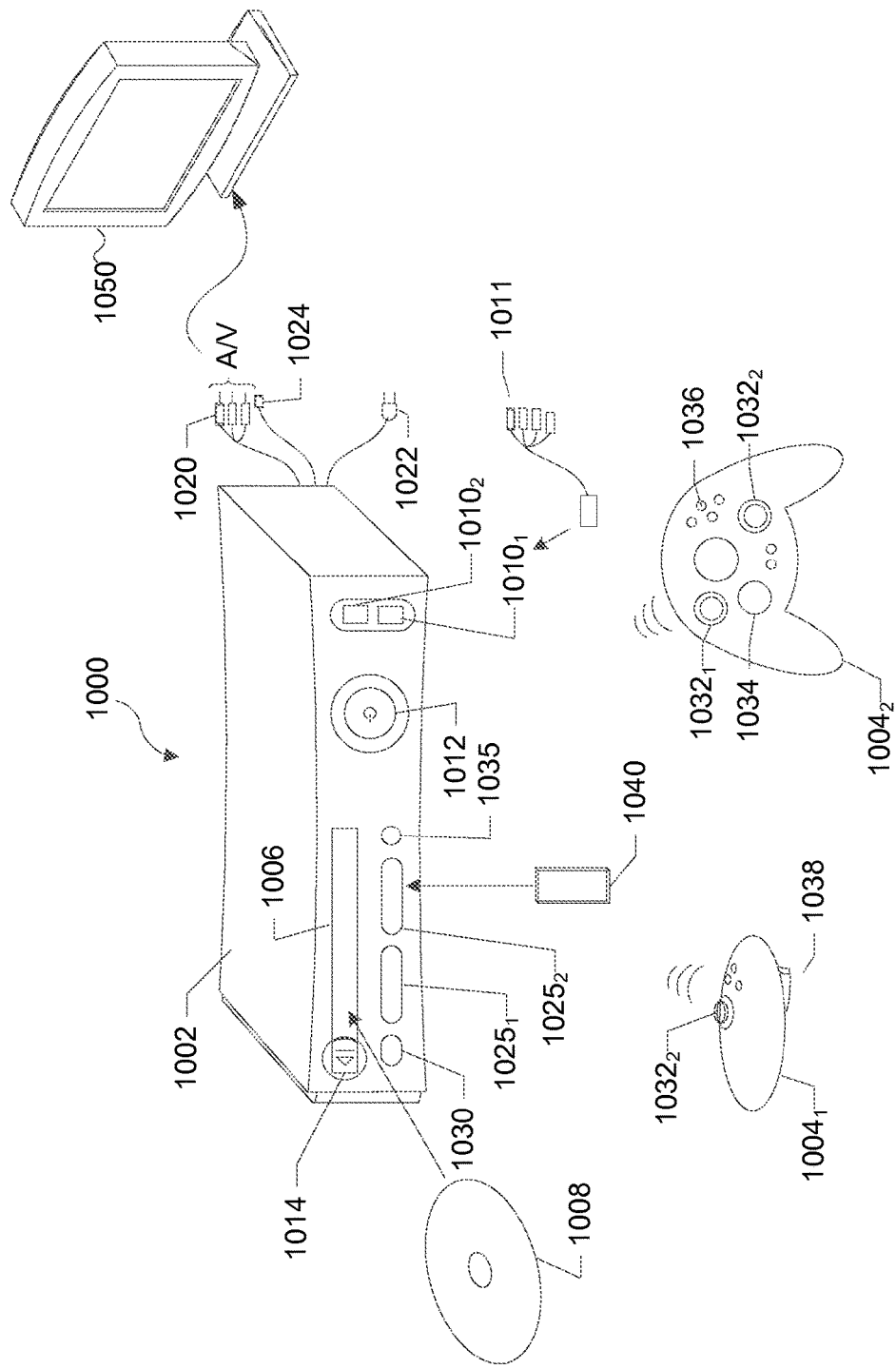
FIG. 6 is an isometric view of an exemplary gaming and media system.

In an embodiment, computing device 107 may be, but is not limited to, a video game and/or media console. FIG. 6 will now be used to describe an exemplary video game and media console, or more generally, will be used to describe an exemplary gaming and media system 1000 that includes a game and media console. The following discussion of FIG. 6 is intended to provide a brief, general description of a suitable computing device with which concepts presented herein may be implemented. It is understood that the system of FIG. 6 is by way of example only. In further examples, embodiments describe herein may be implemented using a variety of client computing devices, either via a browser application or a software application resident on and executed by the client computing device. As shown in FIG. 6, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 6, the console 1002 also includes an optical port 1030 for communicating wirelessly with one or more devices and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the game console. The console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 6, each controller 1004 is equipped with two thumb sticks $1032_1$ and $1032_2$, a D-pad 1034, buttons 1036, and two triggers 1038. These controllers are merely representative, and other known gaming controllers may be substituted for, or added to, those shown in FIG. 6.

In an embodiment, a user may enter input to console 1002 by way of gesture, touch or voice. In an embodiment, optical I/O interface 1135 receives and translates gestures of a user. In another embodiment, console 1002 includes a natural user interface (NUI) to receive and translate voice and gesture inputs from a user. In an alternate embodiment, front panel subassembly 1142 includes a touch surface and a microphone for receiving and translating a touch or voice, such as a voice command, of a user.

Figure 7:
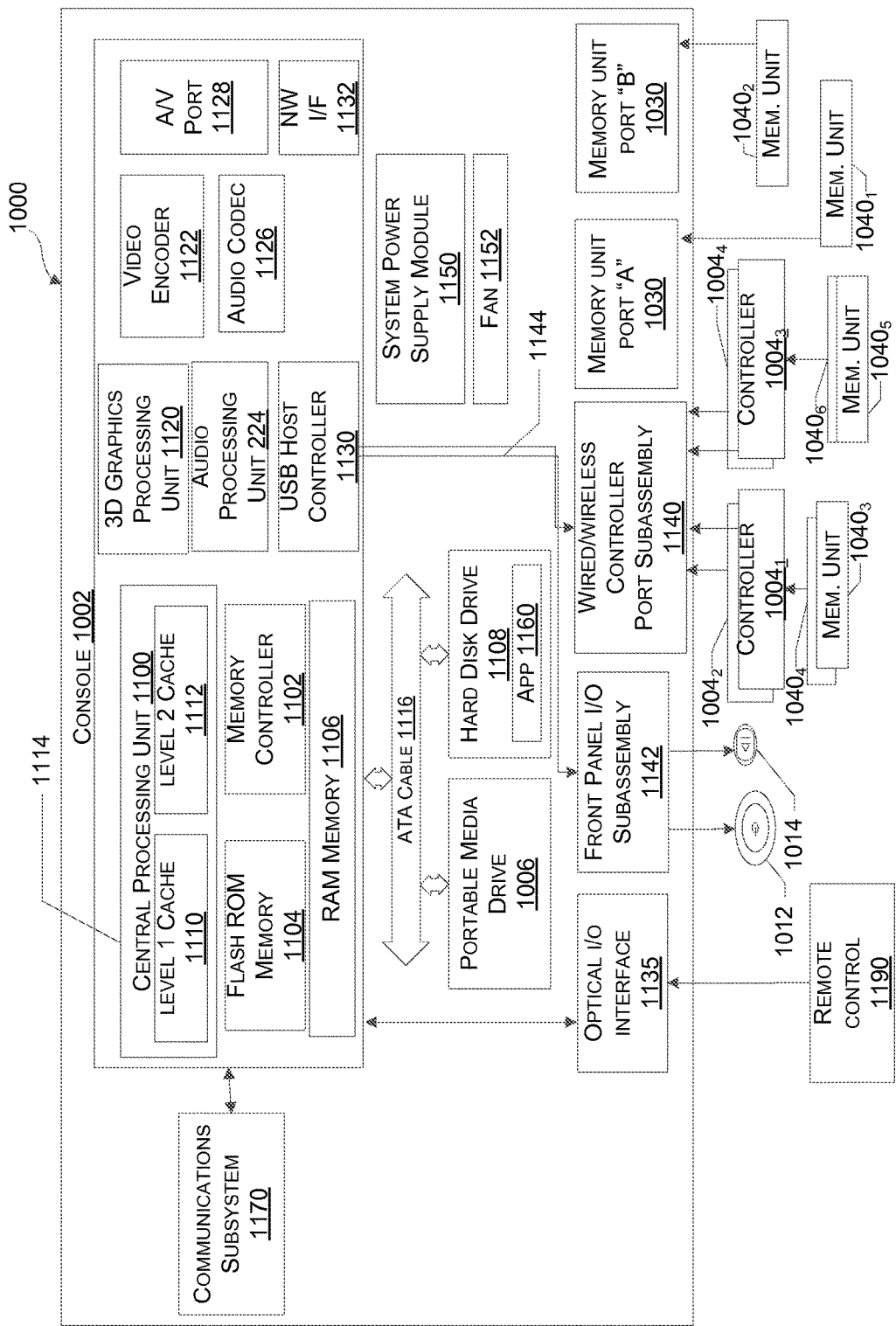
FIG. 7 is an exemplary functional block diagram of components of the gaming and media system shown in FIG. 7.

In an embodiment, multiple microphones 1011 may be plugged into a USB port 1010 to provide a four channel signal representing a user's speech, such as an operating system command and/or application command, to console 1002. In alternate embodiments, a single microphone may be used. In an embodiment, four 16 kHz 24 bit audio signals are provided from multiple microphones 1011 to USB port 1010 and at least one audio pipeline. In an embodiment, the at least one audio pipeline includes integrated circuits and/or processor readable instructions to process at least one audio signal. In an embodiment, the at least one audio pipeline reduces noise associated with the at least one audio signal, such as other users speaking or audio from an electronic interactive game application. In an embodiment, one audio pipeline is used for audio signals representing operating system commands and a second separate audio pipeline is used for audio signals representing application command. In an embodiment, four audio signals from the four microphones are input to both audio pipelines. Each audio pipeline then outputs a single channel audio signal as system audio 310 and application audio 311 to OS 300 as illustrated in FIG. 3. In an embodiment, an audio pipeline includes at least an audio processing unit 224 as shown in FIG. 7.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games stored on a memory medium, as well as for downloading and playing games, and reproducing pre-recorded music and videos, from both electronic and hard media sources. With the different storage offerings, titles can be played from the hard disk drive, from an optical storage disc media (e.g., 1008), from an online source, or from MU 1040. Samples of the types of media that gaming and media system 1000 is capable of playing include:

Game titles or applications played from CD, DVD or higher capacity discs, from the hard disk drive, or from an online source.

Digital music played from a CD in portable media drive 1006, from a file on the hard disk drive or solid state disk, (e.g., music in a media format), or from online streaming sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select an electronic interactive game using the controller 1004 and display state solvability information as discussed below.

FIG. 7 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive or solid state drive 1108, and the portable media drive 1006. In alternate embodiments, other types of volatile and non-volatile memory technologies may be used. In one implementation, the CPU 1100 includes a level 1 cache 1110 and a level 2 cache 1112, to temporarily store data and hence reduce the number of memory access cycles made to the hard drive 1108, thereby improving processing speed and throughput.

The CPU 1100, the memory controller 1102, and various memories are interconnected via one or more buses. The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) or faster data rate DRAM modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

In another embodiment, at least CPU 1100, level 1 cache 1110, level 2 cache 1112, memory controller 1102 and RAM memory 1106 are included in a System on a Chip (SoC). In an embodiment, CPU 1100 is replaced with processor cores. In an embodiment, RAM memory 1106 is replaced with high performance memory, such as Wide I/O DRAM and the function of memory controller 1102 is performed by processor cores. Another type of memory that is not high performance memory, such as LPDDR3 DRAM, may be coupled to a SoC in an embodiment.

A SoC (a.k.a. SOC) is an integrated circuit (IC) that integrates electronic components and/or subsystems of a computing device or other electronic system into a single semiconductor substrate and/or single chip housed within a single package. For example, memory that was previously in a memory module subsystem in a personal computer (PC) may now be included in a SoC. Similarly, memory control logic may be included in a processor of a SoC rather than in a separately packaged memory controller.

As one of ordinary skill in the art would appreciate, other electronic components may be included in a SoC. A SoC may include digital, analog, mixed-signal, and/or radio frequency circuits—one or more on a single semiconductor substrate. A SoC may include oscillators, phase-locked loops, counter-timers, real-time timers, power-on reset generators, external interfaces (for example, Universal Serial Bus (USB), IEEE 1394 interface (FireWire), Ethernet, Universal Asynchronous Receiver/Transmitter (USART) and Serial Peripheral Bus (SPI)), analog interfaces, voltage regulators and/or power management circuits.

In alternate embodiments, a SoC may be replaced with a system in package (SiP) or package on package (PoP). In a SiP, multiple chips or semiconductor substrates are housed in a single package. In a SiP embodiment, processor cores would be on one semiconductor substrate and high performance memory would be on a second semiconductor substrate, both housed in a single package. In an embodiment, the first semiconductor substrate would be coupled to the second semiconductor substrate by wire bonding.

In a PoP embodiment, processor cores would be on one semiconductor die housed in a first package and high performance memory would be on a second semiconductor die housed in a second different package. The first and second packages could then be stacked with a standard interface to route signals between the packages, in particular the semiconductor dies. The stacked packages then may be coupled to a printed circuit board having memory additional memory as a component in an embodiment.

In embodiments, processor cores includes multiple processors that executes (or reads) processor (or machine) readable instructions stored in processor readable memory. An example of processor readable instructions may include an OS and/or an application software program (application) for computing device 107 (such as OS 205 and applications 211-213 shown in FIG. 2). Processor cores may use high performance memory and additional memory in response to executing processor readable instructions of an OS and application. In an embodiment, processor cores may include a processor and memory controller or alternatively a processor that also performs memory management functions similarly performed by a memory controller. Processor cores may also include a controller, graphics-processing unit (GPU), digital signal processor (DSP) and/or a field programmable gate array (FPGA). In an embodiment, high performance memory is positioned on top of a processor cores.

In embodiments, high performance memory and additional memory are include in one or more arrays of memory cells in an IC disposed on separate semiconductor substrates. In an embodiment, high performance memory and additional memory are included in respective integrated monolithic circuits housed in separately packaged devices. In embodiments, high performance memory and additional memory may include volatile and/or non-volatile memory.

Types of volatile memory include, but are not limited to, dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

Types of non-volatile memory include, but are not limited to, types of electrically erasable program read-only memory ("EEPROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display.

FIG. 7 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers $1004_1$-$1004_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, the console 1002 includes a controller support subassembly 1140 for supporting the four controllers $1004_1$-$1004_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

In an embodiment outer surface of console 1002 includes an indicator light that may indicate that a spoken operating system command and/or application command was understood and console 1002 is processing the command. Alternatively, or in addition to, an indicator light may indicate that the requested spoken command was not understood and no action is being taken by the console 1002. In alternate embodiments, the recognition or lack of understanding of a spoken command or utterance of a user may be indicated by a voice output from a speaker of console 1002 from intelligent agent 210, or another source. In still further embodiments, such indication of recognition or lack of understanding of a spoken command or utterance may be indicated on display 1050.

The MUs $1040_1$ and $1040_2$ are illustrated as being connectable to MU ports "A" $1030_1$ and "B" $1030_2$ respectively. Additional MUs (e.g., MUs $1040_3$-$1040_6$) are illustrated as being connectable to the controllers $1004_1$ and $1004_3$, i.e., two MUs for each controller. The controllers $1004_2$ and $1004_4$ can also be configured to receive MUs. Each MU 1040 offers additional storage on which electronic interactive games, game parameters, and other data may be stored. In some implementations, the other data can include any of a digital game component, an executable gaming application, an instruction set for expanding a gaming application, and a media file. When inserted into the console 1002 or a controller, the MU 1040 can be accessed by the memory controller 1102.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100. In an embodiment, application 1160 corresponds to one of applications 211-213 shown in FIG. 2, as described herein.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to display 1050 (FIG. 6), a television, a video projector, or other display device. In this standalone mode, the gaming and media system 1000 enables one or more players to play electronic interactive games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of a computing device 107 discussed above with reference to FIG. 1 and various other Figures. As was explained above, there are various other types of computing devices with which embodiments described herein can be used.

FIG. 8 is a block diagram of one embodiment of a computing device 107 which may host at least some of the software components illustrated in FIGS. 1 and 2. In its most basic configuration, computing device 1800 typically includes one or more processing units/cores 1802 including one or more CPUs and one or more GPUs. Computing device 1800 also includes system memory 1804. Depending on the exact configuration and type of computing device, system memory 1804 may include volatile memory 1805 (such as RAM), non-volatile memory 1807 (such as ROM, flash memory, etc.) or some combination of the two. This most basic configuration is illustrated in FIG. 8 by dashed line 1806. Additionally, device 1800 may also have additional features/functionality. For example, device 1800 may also include additional storage (removable and/or non-removable) including, but not limited to, magnetic or optical discs or tape. Such additional storage is illustrated in FIG. 8 by removable storage 1808 and non-removable storage 1810.

Device 1800 may also contain communications connection(s) 1812 such as one or more network interfaces and transceivers that allow the device to communicate with other devices. Device 1800 may also have input device(s) 1814 such as keyboard, mouse, pen, voice input device, touch input device, gesture input device, etc. Output device(s) 1816 such as a display, speakers, printer, etc. may also be included. These devices are well known in the art so they are not discussed at length here.

In embodiments, illustrated and described signal paths are media that transfers a signal, such as an interconnect, conducting element, contact, pin, region in a semiconductor substrate, wire, metal trace/signal line, or photoelectric conductor, singly or in combination. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines. In still other embodiments, signal paths are unidirectional (signals that travel in one direction) or bidirectional (signals that travel in two directions) or combinations of both unidirectional signal lines and bidirectional signal lines.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method to operate a computing device, the method comprising:
   receiving, by a microphone, first analog audio data that represents a global command, and second analog audio data that represents an application command;
   transforming, via an analog to digital converter, the first and second analog audio data into first and second digital audio data;
   receiving, by a first speech recognizer within the computing device, the first digital audio data, the first speech recognizer configured to recognize global commands in digital audio data and output the global commands and associated confidence levels to an operating system;
   receiving, by a second speech recognizer within the computing device, the second digital audio data, the second speech recognizer operating simultaneously with the first speech recognizer for at least a portion of a time, and the second speech recognizer configured to recognize application commands in digital audio data and output the application commands and associated confidence levels to an application controlled by the operating system;
   determining that the first digital audio data represents a global command and that the second digital data represents an application command by:
      interpreting the second digital audio data as the application command in the absence of detecting via the first speech recognizer a reserved word and by detecting via the second speech recognizer the application command in the second digital audio data, and
      interpreting the first digital audio data as the global command where the reserved word and the global command following the reserved word are detected via the first speech recognizer, and not receiving the second digital audio data by the second speech recognizer after the reserved word is detected until determining that a global system interaction is complete; and
   performing, by the computing device, a computing operation in response to one of the first digital audio data that represents the global command and the second digital audio data that represents the application command.

2. The method of claim 1, wherein the first and second speech recognizers are included in the operating system.

3. The method of claim 2, wherein the computing device includes an intelligent agent, and wherein the method further includes providing a voice out, by the intelligent agent, in response to one of the first digital data that represents the global command and the second digital data that represents the application command.

4. The method of claim 1, wherein the global command includes at least one of launching another application, closing another application, switch between running applications, a social command, search within the application, search across a system, controlling settings for the application, controlling settings for the system, pausing background music and controlling a voice call and controlling a playing of a video.

5. The method of claim 1, wherein the application command includes a game command, navigation within a menu, transport control and browse the application for available content.

6. The method of claim 1, wherein a single reserved word is used.

7. The method of claim 2, wherein at least the second speech recognizer includes processor readable instructions executed by another computing device that is remote from the computing device.

8. The method of claim 1, wherein at least the second speech recognizer includes a natural language software component to interpret the application command.

9. An apparatus comprising:
   at least one microphone to receive at least a first analog audio signal that represents a global command and a second analog audio signal that represents an application command;

an analog to digital converter for converting the at least first and second analog audio signals into first and second digital audio data;
at least one processor; and
at least one processor readable memory to store an operating system having processor readable instructions that includes a first speech recognizer configured to recognize global commands in digital audio data and output the global commands and associated confidence levels to the operating system and a second speech recognizer configured to operate simultaneously with the first speech recognizer for at least a portion of a time to recognize application commands in digital audio data and output the application commands and associated confidence levels to an application controlled by the operating system, and the at least one processor readable memory to store the application via processor readable instructions,
wherein the at least one processor executes the processor readable instructions of the operating system and application to
categorize the first digital audio data as the global command where a reserved word and the global command following the reserved word are detected via the first speech recognizer,
no longer receive the digital audio data by the second speech recognizer after the reserved word is detected until determining that a global system interaction is complete, and
categorize the second digital audio data as the application command in the absence of detecting via the first speech recognizer the reserved word and by detecting the application command in the second digital audio data via the second speech recognizer,
wherein the at least one processor executes the processor readable instructions of the operating system and application to perform a computing operation in response to one of the first digital audio data that represents the global command and the second digital audio data that represents the application command.

10. The apparatus of claim 9, wherein the at least one processor executes at least a portion of the processor readable instructions of the application in response to the second command.

11. The apparatus of claim 9, wherein the apparatus is included in a game console and the application is an electronic interactive game.

12. The method of claim 1, wherein determining that the first digital audio data represents a global command and that the second digital data represents an application command further comprises chaining together a plurality of global commands following the reserved word.

13. The method of claim 1, wherein determining that the first digital audio data represents a global command and that the second digital data represents an application command further comprises changing from interpreting digital audio data as the global command to the application command based on a cadence of the analog audio data received by the microphone.

14. The apparatus of claim 9, wherein the at least one processor executes the processor readable instructions of the operating system and application to perform at least one of changing from categorizing digital audio data as the global command to the application command based on a cadence of the analog audio signals received by the at least one microphone, and changing from categorizing digital audio data as the application command to the global command based on a cadence of the analog audio signals received by the at least one microphone.

* * * * *